Oct. 15, 1957 P. H. SERSON ET AL 2,809,528
DEVICE FOR DETERMINING THE VERTICAL IN AN AIRCRAFT
Filed Feb. 6, 1952 2 Sheets-Sheet 1

INVENTORS:
Paul Horne Serson and
Stanley Zaner Mack
BY
Alex. E. MacRae
Attorney.

INVENTORS:
Paul Horne Serson and
Stanley Zaner Mack
BY
Attorney.

United States Patent Office 2,809,528
Patented Oct. 15, 1957

2,809,528

DEVICE FOR DETERMINING THE VERTICAL IN AN AIRCRAFT

Paul Horne Serson, Ottawa, Ontario, and Stanley Zaner Mack, Toronto, Ontario, Canada, assignors to His Majesty the King in the right of Canada as represented by the Minister of National Defence Application February 6, 1952, Serial No. 270,132

Claims priority, application Canada February 27, 1951

4 Claims. (Cl. 74—5.22)

This invention relates to a method and means for stabilizing a horizontal platform in an aircraft.

The principal obstacle to making many types of scientific observations from an aeroplane in flight is the difficulty of accurately determining the direction of the vertical. The most direct method of determining the direction of the vertical is by use of a plumb line, but in an aircraft the indication of a plumb line is usually in error because of accelerations associated with the motion of the aircraft. Some of these accelerations are periodic, that is, they act for a time in one direction, gradually decrease, then build up in the opposite direction. The most bothersome periodic accelerations have periods of about two minutes.

In order to achieve greater accuracy in vertical indicating systems, gyroscopes have been introduced. However, it is difficult to keep a gyroscope vertical to the required degree of accuracy. A perfectly constructed gyroscope freely supported would hold a constant orientation in space, but this in itself would not suffice since the direction of the vertical relative to the stars is constantly changing due to the rotation of the earth and the velocity of the aircraft over the curved surface of the earth. Moreover, practical gyroscopes do not remain perfectly balanced, and they are affected by friction in their supporting gimbals, so that they wander about unpredictably. It is hence obvious that a "vertical" gyroscope must be controlled if it is to remain even near the vertical for very long.

A relatively simple erection system will keep the axis of a gyroscope within a degree of the vertical in an aircraft in steady flight, as is done in most automatic pilots. This is about the limit of accuracy which can be obtained by such systems, because an aircraft in flight undergoes periodic accelerations with amplitudes of about ½ ft./sec./sec., and periods of the order of two minutes.

As previously indicated, the vertical may be defined as the direction of an unaccelerated plumb line, pendulum, or level bubble. In an aircraft, a pendulum will indicate the apparent vertical which, because of horizontal acceleration $a$, will differ from the true vertical by an angle $\delta$ where sin $$\delta = \frac{a}{g}$$

and $g$ is the acceleration of gravity (32 ft./sec./sec.).

A short period pendulum, hung in an aircraft flying a steady bearing, will oscillate about the true vertical with the period of the aircraft acceleration and with the amplitude ($\delta$) given above. If an observer in an aircraft has a gyroscope and a pendulum, and he notices that the gyroscope axis is not parallel to the pendulum, he cannot tell whether (a) the gyroscope axis is tilted and the pendulum is vertical, or (b) the gyroscope axis is vertical and the pendulum is tilted (by acceleration of the aircraft), or (c) neither is vertical.

It is this identity of the effects due to gravity and those due to acceleration that makes the determination of the vertical in an aircraft difficult and, in fact, theoretically impossible unless further information is available. Neglecting effects due to the earth's rotation, the average acceleration of an aircraft flying a "straight" course at "constant" speed must be zero. This suggests that one assume, to a first approximation at least, the mean apparent vertical to be the true vertical. In conventional vertical gyro systems for aircraft, the gyroscope is used to do this averaging as well as to "remember" the vertical during periods of acceleration. It has been found that accelerations with periods up to two minutes exist, and they may deflect the apparent vertical from the true vertical by as much as a degree.

In typical vertical gyroscopes, as employed in automatic pilot systems, the gyroscope axis simply follows the direction of the apparent vertical when the system is subjected to long period accelerations. In fact, very little averaging takes place until the erection rate is reduced to less than one degree per minute. In order to obtain sufficient "averaging" to reduce the effect of the acceleration on the orientation of the gyroscope to one minute of angle, the erection rate would have to be reduced to about one minute of arc per minute. In practice this would be equivalent to no erection at all since an erection rate of about fifteen minutes per minute is required to overcome the effects of the earth's rotation alone.

It is thus apparent that, since it does not appear possible to keep a gyroscope vertical and unaffected by accelerations, an accuracy of a few minutes cannot be obtained by the conventional gyro systems.

A primary object of the present invention resides in the provision of a method and means for maintaining in a horizontal plane a suitable support in an aeroplane whereby astronomical, magnetic and photographic observations and the like may be made with an accuracy that has not been heretofore possible.

The invention contemplates the provision of an aircraft instrument comprising a pendulum, means for determining the mean vertical direction of the pendulum, a gyroscope the axis of which tends to assume the direction of the mean vertical about which the pendulum oscillates, a platform responsive to the position of the gyroscope whereby it seeks a horizontal plane, means for measuring the angle of deviation of the gyroscope axis from the mean vertical, and means for applying a correcting impulse to the platform proportional to the angle of deviation in order to maintain the platform in a substantially true horizontal plane.

The invention will be described with reference to the accompanying drawings, in which, Figure 1 is a diagrammatic view of a device in accordance with the invention, Figure 2 is a diagram showing diagrammatically the connected relation of the various elements.

Figure 1:
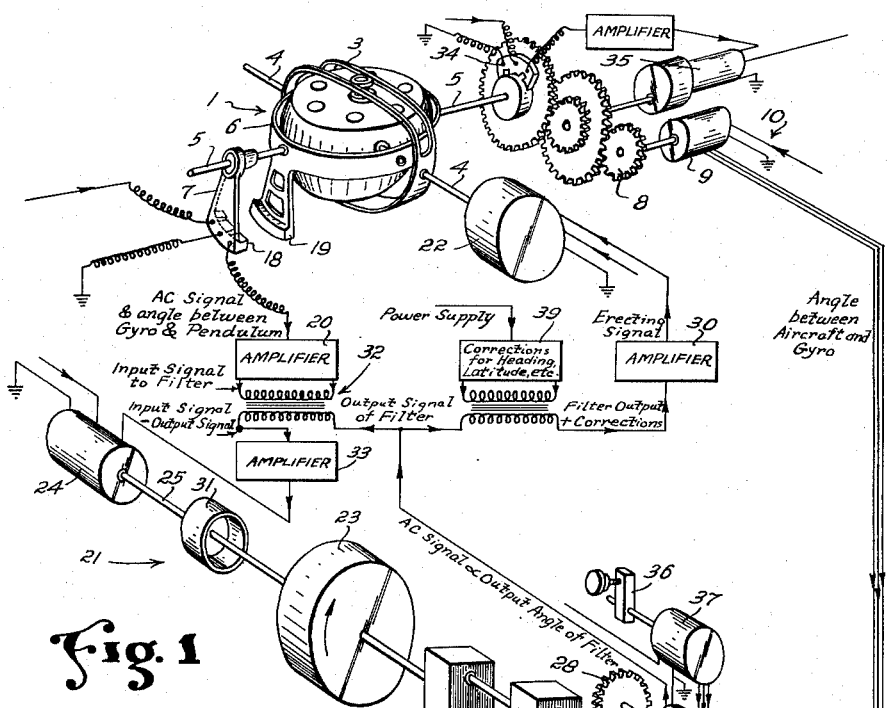
Figure 2:
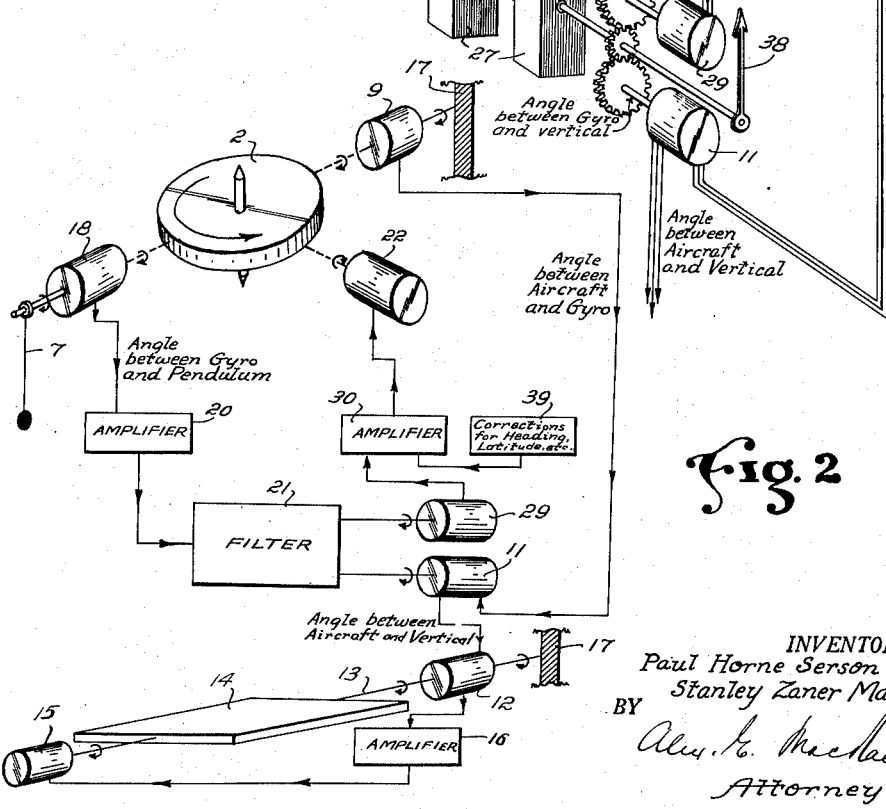

Referring to Figures 1 and 2, a gyroscope 1 of usual type has its rotor 2 mounted in gimbals so that orientation of the gyro axis is unaffected by rolling and pitching of the aircraft, power being supplied to the rotor through axial contacts at the gimbal bearings. A bail 3 is rotatable about the pitch axis of the gyroscope as indicated by the shafts or spindles 4 mounted on the bail. Spindles 5 are mounted on the roll gimbal 6 at the roll axis thereof. A pendulum 7 is suspended from one of the spindles 5 to compare the orientation of the gyroscope with the apparent vertical.

The rotor 2 may be driven about its approximately vertical axis at a speed of about 12,000 R. P. M. by a three-phase 400-cycle induction motor, of which the rotor forms a part.

The rotor of an autosyn transmitter 9 is connected to the shaft 5 of the roll gimbal through gearing 8. This rotor has a single-phase winding connected to a 400-cycle power supply, as indicated at 10. Thus, alternating voltages are induced in the three stator windings of the autosyn. The relative magnitudes of these voltages will depend upon the orientation of the rotor relative to the three stator windings. The three stator windings are connected, as shown, through a differential autosyn 11, to three corresponding stator windings of an autosyn receiver 12, whose rotor is mounted on the roll axis 13 of the platform 14 to be stabilized.

The alternating currents in the three stator windings of autosyn 12 produce a magnetic field whose orientation corresponds to the orientation of the rotor of autosyn 9 at the gyroscope. Unless the rotor of autosyn 12 is perpendicular to this alternating magnetic field, an alternating voltage will be induced in its winding. This alternating current signal controls a servo motor 15, also mounted on the roll axis 13 of the platform, through an amplifier 16, driving the motor in the proper sense to reduce the signal to zero. Thus, if the platform is initially adjusted to be perpendicular to the axis of rotation of the gyroscope, it will retain this perpendicularity regardless of the motions of the aircraft, the motor 15 correcting any mis-orientations of the platform that may occur.

The means for compensating for the deviation from the vertical of the gyroscope will now be described. Expressing the controlling factors algebraically, let $\alpha$ be the angle between the aircraft and the true vertical, $\theta$ the angle between the gyroscope and the true vertical, and $\delta$ the angle between the apparent vertical and the true vertical. These quantities cannot be measured directly because the direction of the true vertical is unknown. However, as will appear from the foregoing description, autosyn 9 measures the angle $\theta+\alpha$ between the gyroscope and the aircraft frame indicated at 17. A differential transformer 18, actuated by the pendulum 7, works against an armature 19 on the gimbal frame 6 to produce an alternating signal, the magnitude and phase of which are determined by the angle between the gyroscope axis and the aparent vertical $(\theta-\delta)$. This signal is amplified by an amplifier 20 and passed through a low pass mechanical filter 21, the action of which will be described in greater detail later. Its output is an angle on a shaft which is the average of $\theta-\delta$ or $\overline{\theta-\delta}$. Now, $\overline{\theta-\delta}=\overline{\theta}-\overline{\delta}$ and assuming that the average of $\delta$ is zero, i. e., $\overline{\delta}=0$, and if the gyroscope inclination is steady, then $\theta=\overline{\theta}$ (the average value of $\theta$). Hence, $(\theta+\alpha)-(\overline{\theta}-\overline{\delta})=\theta-\overline{\theta}+\alpha=\alpha$ if $\theta$ is steady. The angle of roll of the aircraft, $\alpha$, is thus known. The servo system controlling the stabilized platform makes the platform take up this angle with respect to the aircraft frame, and so the platform is held horizontal.

The system will function in this manner only if $\theta-\overline{\theta}=0$; that is, only if the gyroscope is "steady." However, merely having the gyro axis oriented in a fixed direction in space is not sufficient to ensure $\theta-\overline{\theta}=0$. To fulfil this condition, $\theta$ must be steady, and $\theta$ is just the component of the gyroscope's lean about the roll axis. As the aircraft yaws (or turns) the direction of the roll axis in space changes, and so $\theta$ can change even when the gyro axis remains steady in space. It has been found that the change in $\theta$ due to yawing on a normal "straight" course will be negligible if the gyroscope axis is within a degree of the vertical.

To keep the gyroscope steady, and fairly close to the vertical, a torque must be applied to it to keep it "precessing" or turning through space as the direction of the vertical changes due to the earth's rotation and the motion of the aircraft over the earth's curved surface. Torques are also required to counteract stray torques due to friction and unbalance of the gyroscope in its gimbals. This torque is applied by means of a torque motor 22, which is mounted on a shaft 4 to act about the pitch axis of the gyroscope and thus cause the necessary precession about the roll axis. The torque is arranged to be proportional to the output angle of the filter 21. It is well known that the rate of precession of a gyroscope is proportional to the applied torque and perpendicular to the direction of the applied torque.

The filter 21 comprises a flywheel 23 arranged to be driven by a servo motor 24 by means of shaft 25. The shaft 25 is connected through gear boxes 27 and gears 28 to an autosyn transmitter 29, which is connected through an amplifier 30 to the torque motor 22. The output of the filter is also applied through the autosyn 11 to the autosyn receiver 12, as shown.

The servo motor 24 attempts to turn the flywheel 23 until the rotors of autosyns 29 and 11 turn through an angle $(\theta-\delta)$. The inertia of the flywheel prevents it from responding to any quick changes of $(\theta-\delta)$. The effect of periodic accelerations on the filter is somewhat as follows: When $\delta$ begins to increase in a given direction, the flywheel actually does begin to turn slowly, but this effect transmitted through a large gear train has not had sufficient time to turn the rotors of autosyns 29 and 11 very far when $\delta$ changes direction and begins to slow down the flywheel and cause it to reverse. If $\overline{\theta-\delta}$ is the angle through which the rotor of the autosyn turns, then, since $\overline{\delta}$ is nearly zero, $\overline{\theta-\delta}=\overline{\theta}$, which will be very nearly equal to $\theta$ if $\theta$ is steady.

A copper cup 31 is mounted on shaft 25 and is arranged to rotate in a magnetic field which induces in it eddy currents which provide damping to prevent the system from oscillating.

The output of autosyn 29 is an electrical signal proportional to $\overline{\theta}$, the component of inclination of the gyroscope to the vertical about the roll axis. As previously indicated, the torque motor 22 applies a torque proportional to $\overline{\theta}$, which holds the gyroscope steady and nearly vertical. In general $\overline{\theta}$ will not be zero because it must provide the torque to overcome the effects of friction and the earth's rotation.

The signal $\overline{\theta}$ is subtracted from the output $(\theta-\delta)$ of amplifier 20 by a transformer 32. The resulting difference, $\theta-\delta-\overline{\theta}$, is amplified by an amplifier 33 and fed to the servo motor 24, which therefore applies a torque to the flywheel proportional to $\theta-\delta-\overline{\theta}$. It will thus be clear that once the flywheel has turned sufficiently to make $\theta=\overline{\theta}$, then the torque applied to the flywheel will be proportional to $\delta$. It has already been pointed out that $\delta$ is periodic and does not act in one direction long enough to turn the flywheel appreciably. Thus, periodic accelerations have been "filtered" from the system.

A transformer 34, also mounted on the roll axis of the roll gimbal 6, is turned by a servo motor 35, to follow the apparent motion of the gyroscope with respect to the aircraft.

If this alignment is not correct, an electrical signal will be produced which, when amplified, drives the servo motor 35 until the signal is zero. The autosyn 9 is therefore effectively connected to the gimbal of the gyroscope, except that it does not react on the gyroscope because it is turned by the servo motor 35, not the gyroscope. The autosyn 9, as previously indicated, transmits the angle between the gyroscope and the aircraft $(\theta+\alpha)$, to the differential autosyn 11, where it is subtracted from $\overline{\theta}$. The difference $\theta-\overline{\theta}+\alpha$ is very nearly $\alpha$, the angle between the aircraft vertical and the true vertical, which information permits determination of the vertical and thus stabilization of the platform.

A levelling adjustment means 36 may be connected to autosyn 29 through autosyn 37. An indicator 38 is connected to the gearing 28.

In operation, if the system is started with the gyroscope axis tilted at, for instance, 4° to starboard from the vertical, the output shaft of the filter 21 will read 4° in a few minutes, and a signal will be applied to the torque motor 22. This motor applies a torque about the pitch axis, causing the gyroscope to precess about the roll axis at a rate of 1° per minute towards the vertical. As the gyroscope axis approaches the vertical, the filter output, $\theta$, follows it, and the erection signal decreases. Thus the system will eventually come into equilibrium.

Due to the rotation of the earth, velocity of the aircraft, and other factors, the direction of the vertical changes in space, and it is necessary to apply a torque to the gyroscope to make it precess so that it will make a steady angle with the verticle. In equilibrium, the gyro axis will not necessarily be vertical, but will have the "lean" from the vertical which will cause the torque motor 22 to supply the necessary torque to keep the gyroscope steady.

This lean may amount to one degree and is objectionable for several reasons. To remove the lean, a unit 39 is provided to apply the necessary torque. The latitude, heading of the aircraft, and aircraft velocity are set into unit 39, which computes the necessary torques and adds the corresponding signals to the output signal of the filter.

After the gyroscope has been running for a time it may develop a lean in spite of these precautions. This is because mechanical imperfections may cause it to go off balance. The torques due to imperfect balancing must be cancelled by applying additional signals to the torque motors if the gyroscope is to remain vertical. The appropriate signal may be computed by a suitable integrator included in unit 39.

The properties of the above-described flywheel type of filter 21 may be denoted by its characteristic differential equation:

$$p\ddot{x}_o + r\dot{x}_o + x_o = x_i$$

where $x_i$ = the input signal
$x_o$ = the output signal $p$ and $r$ are constants of the system determined by the gain of the amplifier, the characteristics of the motor, the damping system, the flywheel and the reduction gear ratio. The dots denote differentiation with respect to time.

Alternative filter systems may be provided to obtain the same differential equation by other means. One such system is illustrated in Figure 4, and it may be used interchangeably with the flywheel type of filter because it operates identically on the input signal.

Figure 4:
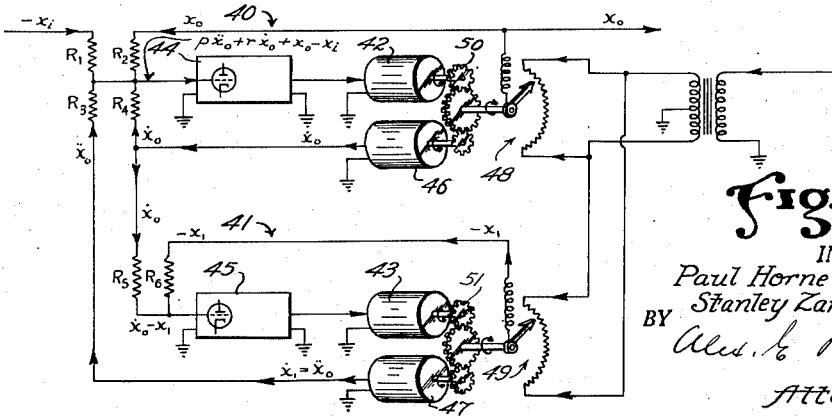
Figure 4 is a diagram of a modified form of filter system.

Referring to Figure 4, the filter comprises two electromechanical assemblies 40 and 41 each containing a servo motor 42, 43, a high-gain amplifier 44, 45, a rate generator 46, 47, and a linear potentiometer 48, 49. The rate generator produces an alternating voltage whose amplitude is proportional to the angular velocity of the motor shaft, and whose phase depends on the sense of the rotation. The potentiometer is connected to an alternating voltage of constant amplitude and phase in such a way that the output voltage at the slider is proportional to the angle through which the shaft is rotated. The potentiometer shaft is connected to the servo motor by appropriate reduction gears 50, 51.

The electrical signals from the rate generators and potentiometers are mixed with the input signal and with each other by means of the resistive adding networks $R_1$, $R_2$, $R_3$, $R_4$, and $R_5$, $R_6$, to obtain the desired characteristics.

The output signals of the potentiometers 48, 49 may be designated as $x_o$ and $x_1$, respectively.

Considering first the operation of assembly 41, its input signal is $$\dot{x}_o$$

a voltage proportional to the angular velocity of the rate generator 46. The signal $x_1$, proportional to the rotation of the shaft of potentiometer 49, is subtracted from the input $$\dot{x}_o$$

by the network $R_5R_6$ and its difference is amplified by 45 to drive the motor 43. If $$\dot{x}_o - x_1 = 0$$

the motor will quickly turn the shaft of 49 to make $$x_1 = \dot{x}_o$$

While the system is operating, $x_1$ is thus effectively equal to $$\dot{x}_o$$

and the output of 47 is proportional to $$\dot{x}_1$$

will also be proportional to $$\ddot{x}_o$$

The operation of assembly 40 is similar, except that the signal fed to amplifier 44 is $$p\ddot{x}_o + r\dot{x}_o + x_o - x_i$$

If this quantity is not zero, the motor 42 quickly turns the shaft of potentiometer 48 to make $$p\ddot{x}_o + r\dot{x}_o + x_o - x_i = 0$$

Thus, the system continuously varies the output $x_o$ to make it conform to the desired relation to the input $x_i$ given by the equation $$p\ddot{x}_o + r\dot{x}_o + x_o = x_i$$

The desired values of the constants of the system $p$ and $r$ are obtained by the proper choice of the relative values of resistors $R_1$, $R_2$, $R_3$, $R_4$, $R_5$, $R_6$.

It will be apparent that the system may be extended by the addition of units similar to 41 to obtain characteristic differential equations of the third order and higher orders.

Figure 3:
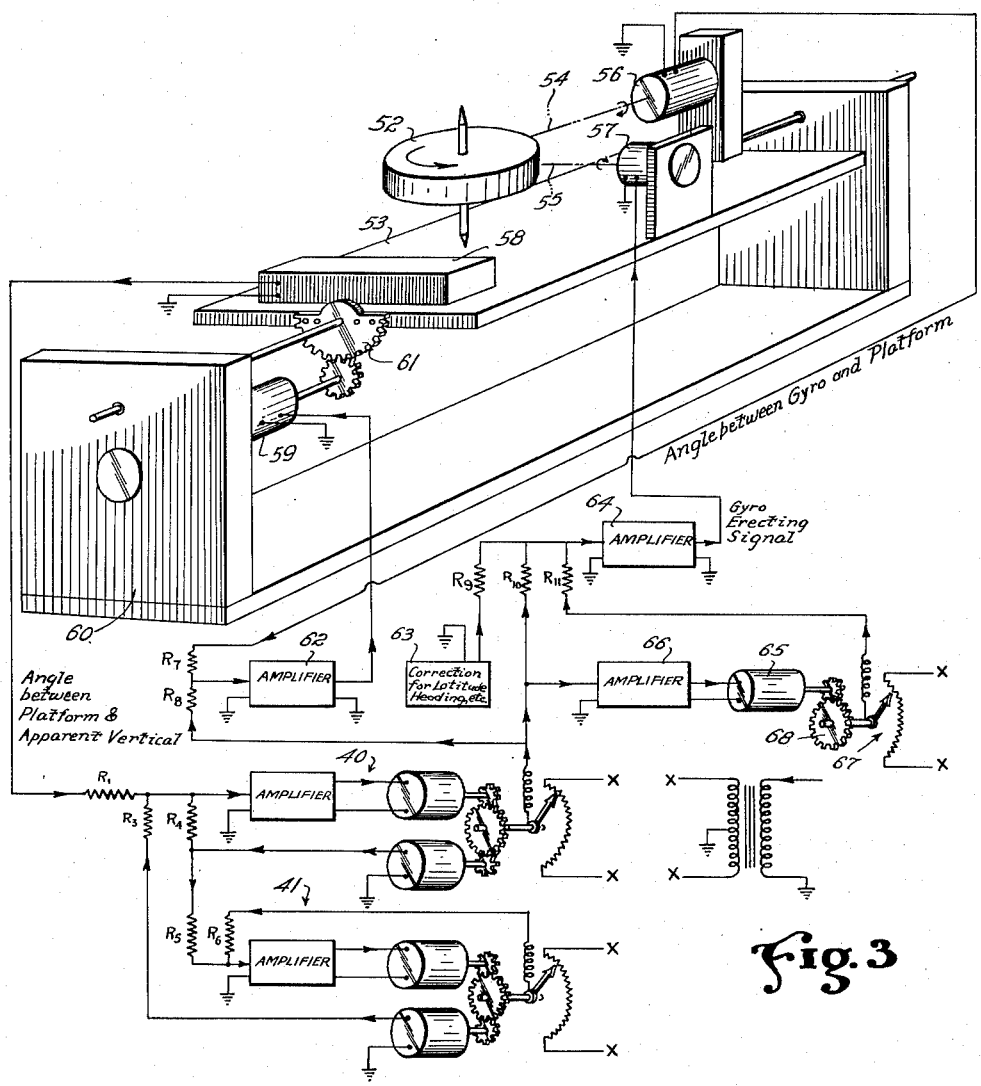
Figure 3 is a diagrammatic view of an alternative form of apparatus.

Figure 3 illustrates a modified form of the invention wherein the rotor 52 of a suitable gyroscope is supported on the platform 53 to be stabilized by gimbal means (not shown), the roll axis being indicated at 54 and the pitch axis at 55. An angle transmitter 56 is mounted on the roll axis and produces a signal proportional to the angle in roll between the normal to the platform and the rotor or gyro axis. A servo motor 57 applies torques to the gyroscope about the pitch axis.

An accelerometer 58 is mounted on the platform and is arranged to give a signal proportional to any component of acceleration (including gravity) which is in the plane of the platform and perpendicular to the roll axis. Signals from the accelerometer are filtered by a filter system such as illustrated in Figure 4 and including the pair of assemblies 40, 41. A servo motor 59 is mounted on the aircraft frame 60 and rotates the platform relative to the frame through suitable gearing 61. The feedback resistor $R_2$ is unnecessary in the present filter system, since the feedback loop for the filter is closed through the servo motor 59, the platform, and the accelerometer 58.

Assuming that the device starts from equilibrium, with the potentiometer 48 giving a zero signal, unless the platform is perpendicular to the gyroscope axis, angle transmitter 56 will give a signal which is added to the signal 48 (zero) by network $R_7R_8$. The sum of these signals is amplified by a high-gain amplifier 62 to drive servo motor 59 until the sum of the signals becomes zero. Thus the platform will be kept perpendicular to the axis of rotor 52 (provided, of course, that 48 gives a zero signal).

If the gyro axis is not vertical, the platform will not be horizontal, and the signals from accelerometer 58 will be predominantly in one sense as the apparent vertical oscillates about the true vertical. This will cause the signal from potentiometer 48 to increase slowly. Amplifier 62 will drive motor 59 to tilt the platform in such a way that the signal from transmitter 56 increases by an amount corresponding to the increase in the signal from 48, i. e., the sum of the two signals must remain zero. The signal from 48 will increase slowly until the platform comes into the horizontal, even if the gyro axis is not vertical.

The signal from 48 is at all times proportional to the angle between the gyro axis and the normal to the platform. Since the platform is kept horizontal by the action described above, this signal will represent the angle between the gyro axis and the true vertical, and can be used to maintain the gyro axis in the vertical. The signal from 48 is mixed, by means of a network $R_9R_{10}R_{11}$, with its integral with respect to time, and with a correction for latitude and aircraft heading from unit 63. The sum of these signals is amplified by an amplifier 64 and applied to the torque motor 57 as shown. The motor 57 applies torques about the pitch axis of the gyroscope which cause the gyroscope to precess about the roll axis until its axis of rotation is vertical.

Integration of the signal from 48 is accomplished by an integrator which comprises a servo motor 65, controlled by an amplifier 66 and arranged to turn an output potentiometer 67 through suitable gearing 68. The purpose of the integrated erection signal is to correct any change of balance in the gyroscope which may occur during its operation. The direct signal provides damping of the long-period oscillations of the gyro-integrator system. The purpose of the correction for latitude and heading is, as in the modification of Figure 1, to reduce the amplitude of the transients due to the earth's rotation which occur after a change in aircraft heading.

While the drawing and description refer only to stabilization about the aircraft's roll axis, it will be understood that a similar system, using the same vertical gyroscope, stabilizes the platform about the pitch axis.

It will be apparent that control of the output signal of the filter (rather than by the unfiltered pendulum signal, as in conventional vertical gyro systems) permits the use of tighter control; i. e., larger erection rate for a given angle of deflection of the gyro axis from the vertical without introducing fluctuations due to periodic accelerations.

We claim:

1. An aircraft instrument comprising a gyroscope, a pendulum suspended from one of the roll and pitch axes of the gyroscope, means responsive to the directional positions of the pendulum and vertical axis of the gyroscope for producing an alternating signal the magnitude and phase of which are determined by the size of the angle between said positions, means for filtering from said signal the periodic components thereof due to aircraft acceleration, a platform supported about its axis corresponding to the axis of said gyroscope from which said pendulum is suspended, a motor for adjusting the level of said platform about its said axis, means responsive to one of the roll and pitch movements of the gyroscope for energizing said motor to maintain said platform perpendicular to the vertical axis of the gyroscope whereby it seeks a horizontal plane, and means responsive to said filtered signal for applying a correcting impulse to the platform to compensate for deviation of the vertical axis of the gyroscope from the true vertical.

2. In an aircraft, a supporting platform for instruments and the like, and means for maintaining said platform in a horizontal plane regardless of the rolling and pitching of the aircraft which comprises a gyroscope, means connecting at least one of the roll and pitch axes of the gyroscope with the corresponding axis of the platform to maintain the latter perpendicular to the vertical axis of the gyroscope, pendulum means for determining the angle between the gyroscope vertical axis and the apparent vertical, means for producing an alternating signal indicative of said angle, means for filtering from said signal periodic components due to aircraft acceleration, and means responsive to said filtered signal for applying correcting impulses to said platform about its said axis to compensate for deviation of the vertical axis of the gyroscope from the true vertical.

3. An instrument supporting platform for an aircraft, as defined in claim 2, wherein said filtering means comprises a motor actuable by said signal, a flywheel drivable by the motor, a pair of autosyns each having a rotor, and gears drivably connecting the rotors with the flywheel, the rotors being drivably unresponsive to periodic components of the signal.

4. An instrument supporting platform for an aircraft, as defined in claim 2, wherein said filtering means comprises a pair of electro-mechanical devices each having a motor, a motor shaft, an amplifier for driving the motor, a potentiometer having a shaft, reduction gears connecting said shafts, and a rate generator connected to the said shafts, said generator producing an alternating voltage whose amplitude is proportional to the angular velocity of the motor shaft, the output voltage of said potentiometer being proportional to the angle through which the motor shaft is rotated.

References Cited in the file of this patent

UNITED STATES PATENTS

| | | |
|---|---|---|
| 2,382,993 | Haskins | Aug. 21, 1945 |
| 2,440,189 | Zworykin | Apr. 20, 1948 |
| 2,497,614 | Libman | Feb. 14, 1950 |
| 2,553,217 | Braddon | Dec. 12, 1950 |
| 2,597,151 | Konet | May 20, 1952 |
| 2,598,672 | Braddon et al. | June 3, 1952 |
| 2,608,867 | Kellogg et al. | Sept. 2, 1952 |